Feb. 11, 1936.   A. A. ARNOLD   2,030,193
BEARING STRUCTURE
Filed Nov. 2, 1932   2 Sheets-Sheet 1
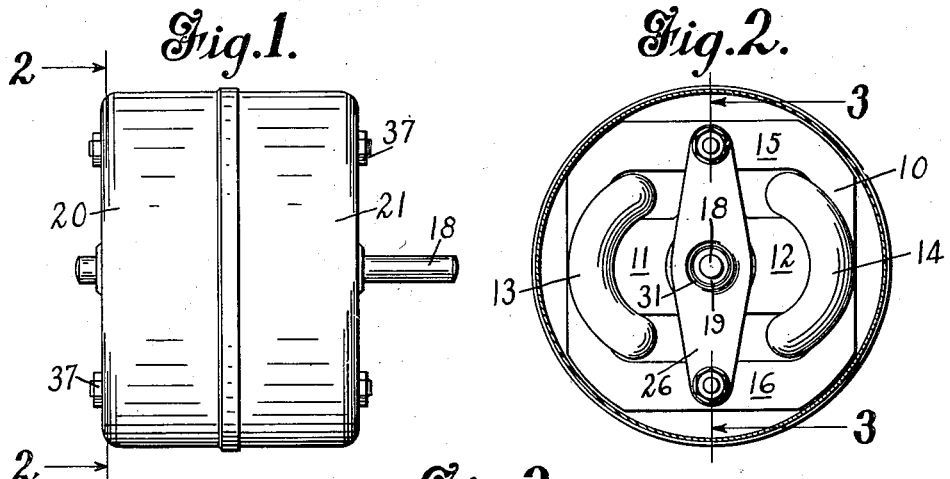
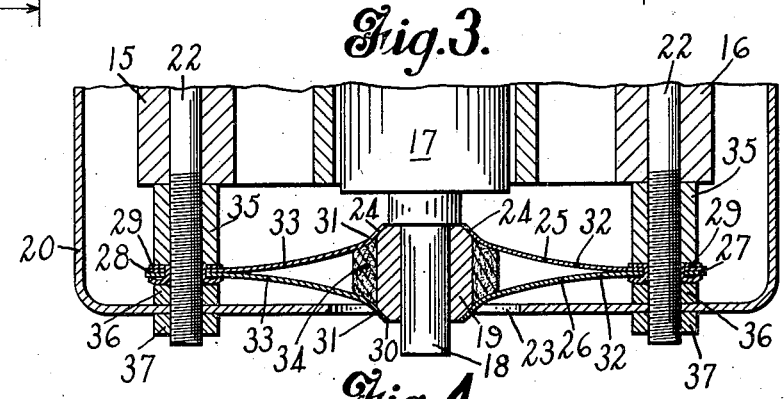
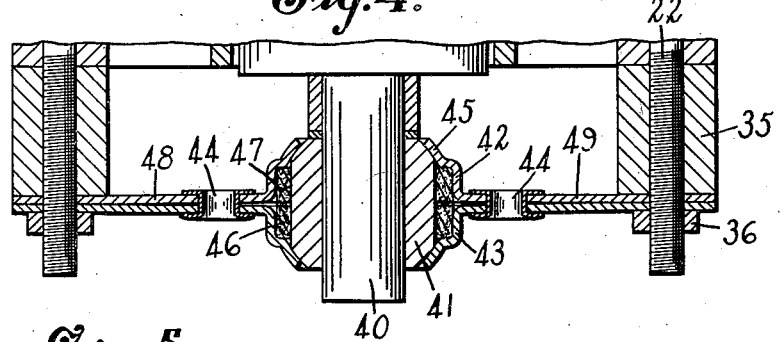
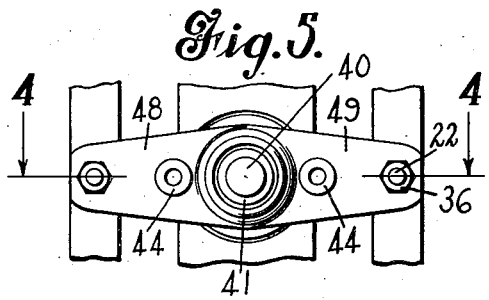
Inventor
Arthur A. Arnold
By Rockwell & Bartholow
Attorneys Feb. 11, 1936.  A. A. ARNOLD  2,030,193
BEARING STRUCTURE
Filed Nov. 2, 1932  2 Sheets-Sheet 2

Inventor
Arthur A. Arnold
By Rockwell & Bartholow
Attorneys

Patented Feb. 11, 1936

2,030,193

UNITED STATES PATENT OFFICE 2,030,193

BEARING STRUCTURE

Arthur A. Arnold, New Haven, Conn., assignor to The A. C. Gilbert Company, New Haven, Conn., a corporation of Maryland Application November 2, 1932, Serial No. 640,807

10 Claims. (Cl. 308—26)

This invention relates to bearing structures and more particularly to the so-called self-aligning and self-oiling shaft bearings. Bearings of this type are especially useful when provided for supporting the armature shafts of small electric motors, obviating the necessity of frequent oiling and facilitating the assembly of the parts of the motor.

When rigidly constructed bearings are provided, it is especially difficult and expensive to properly align the bearings of a comparatively small electric motor, and, therefore, the expense of assembly is increased due to the amount of time consumed in aligning the bearings.

One of the objects of this invention is to provide a bearing structure for rotatable shafts that will be inexpensive to manufacture, readily applied to a supporting frame, and efficient in use.

Another object is to provide a bearing unit that will be self-aligning and self-oiling in an efficient manner.

Still another object is to provide a bearing structure which will yieldingly permit lengthwise movement of the shaft journaled therein.

A further object is to provide a bearing structure consisting of a shaft, a bearing member, an oil container, and a support for the bearing member and the oil container, all assembled together as a unit and which, when so assembled, may be readily disposed in position to support a shaft and as readily removed.

A still further object is to provide an electric motor having such a bearing structure included in its structure and wherein certain parts are common to both structures whereby the cost of manufacture of comparatively small electric motors is appreciably decreased.

To these and other ends the invention consists in the novel features and combinations of parts to be hereinafter described and claimed.

In the accompanying drawings:

Fig. 1 is a side view of an electric motor, embodying the features of this invention;

Fig. 2 is a section on line 2—2 of Fig. 1;

Fig. 3 is an enlarged sectional view on line 3—3 of Fig. 2;

Fig. 4 is a section on line 4—4 of Fig. 5;

Figure 6:
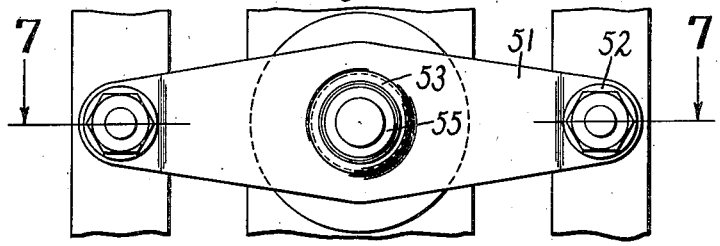
Figure 7:
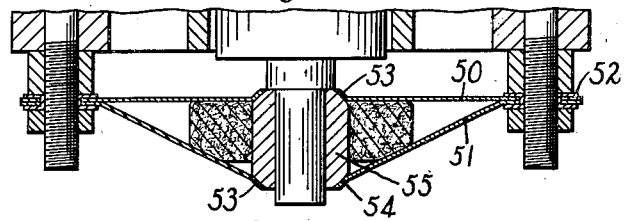
Figure 8:
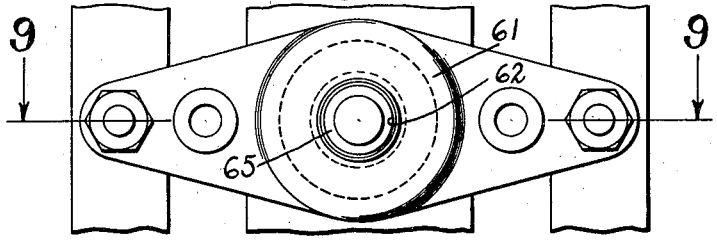

Fig. 5 being an end view of a somewhat modified form of bearing structure, in which the features of this invention are also embodied;

Fig. 6 is an end view of still another embodiment of this invention;

Fig. 7 is a section on line 7—7 of Fig. 6;

Fig. 8 is a further embodiment of this invention, and

Figure 9:
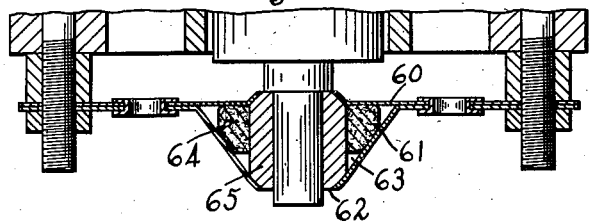

Fig. 9 is a section on line 9—9 of Fig. 8.

The bearing structure embodying the features of this invention is shown in the drawings as being applied to an electric motor to support its armature shaft, but obviously this bearing structure need not be limited to such use. In the embodiment shown in Figs. 1 to 3 inclusive, the electric motor comprises a field core 10 of the enclosed type, the pole arms 11 and 12 extending axially inwardly and diametrically opposing each other, and having the field coils 13 and 14 disposed respectively thereabout. Field pole connecting members 15 and 16 are disposed generally parallel to the pole arms 11 and 12, being spaced therefrom one on either side thereof.

An armature or rotor 17, having a shaft 18, is disposed between the pole arms 11 and 12, with each end of the shaft 18 journaled in a bearing block or sleeve 19. A sheet metal casing composed of opposing cup-shaped parts 20 and 21 is disposed about the field core and secured thereto by rods 22. The rods 22 are threaded at each end and one of them passes through the pole connecting members 15 and 16, and extends therefrom at each end thereof. The extreme ends of the rods 22 extend through corresponding openings in the casing parts 20 and 21. Each casing part is provided with an end opening 23 through which the shaft 18 may project.

The bearing blocks 19 are generally cylindrical and their end edges are beveled or preferably rounded as at 24, the center of the arc being located on the center line or axis of the shaft 18 substantially intermediate the ends of the bearing blocks 19. The bearing blocks 19 are supported between similarly formed sheet metal plates 25 and 26, that extend between the pole connecting members 15 and 16. The plates 25 and 26, in this instance, are secured together at their ends 27 and 28 by eyelets 29, the opening in each eyelet being of sufficient dimension to permit it to be slipped on to one of the rods 22. Each plate 25 and 26 is provided with a centrally disposed opening 30, permitting the shaft 18 to pass therethrough. The portion 31 about the opening 30 of each plate is bulged outwardly and preferably formed to fit the curvature of the end edges of the bearing block 19 engaged thereby whereby the bearing block when held between these plates may rock or rotate in any direction.

Elongated arm portions 32 and 33 connect portion 31 with the ends 27 and 28 of each plate. The arm portions 32 and 33 of each plate 25 and 26 bow outwardly from their connected ends 27 and 28, and due to the resiliency of the material of which they are made, clamp the bearing block 19 tightly between the opposing portions 31 thereof. A fibrous oil saturated ring 34 surrounds the bearing block 19 and is disposed between the arm portions 32 and 33 of the plates 25 and 26. The arm portions engage the ring 34 and press it against the bearing block. Oil channels may be formed in the block 19 in communication with the shaft opening therein, but preferably the block 19 is made of porous bearing metal whereby oil from the ring 34 will pass therethrough to lubricate shaft 18.

The ends of plates 25 and 26 are spaced from the pole connecting members 15 and 16 by spacing blocks 35 through which rods 22 pass. The ends 27 and 28 of plates 25 and 26 are tightly clamped to the blocks 35, and they in turn to the pole connecting members by a nut 36 that threadingly engages the respective rod 22. The adjacent casing part 20 or 21 is secured on rods 22 and clamped against nut 36 by another nut 37.

In the embodiment shown in Figs. 4 and 5, the armature shaft 40 is journaled in a bearing block 41 that is formed similarly to block 19 described above. In this instance, the bearing blocks are held between similarly formed plates 42 and 43 which are secured together by eyelets or rivets 44, eyelets being shown, intermediate their ends and the bearing block 41. Plates 42 and 43 are each bulged out about the bearing block 41 as at 45 to fit the bearing block rounded ends and are cupped out as at 46. A fibrous oil saturated ring 47 is provided and disposed about the bearing block 41 within the cupped-out portions 46 of the plates 42 and 43. In this instance, the cupped-out portions 46 of plates 42 and 43 substantially completely enclose the block 41 and ring 47. The ends of plates 42 and 43 are provided with openings through which rods 22 may pass and the plates are secured thereby by nuts 36 and spaced from the pole connecting members 15 and 16 by space blocks 35, as in the previous embodiment. As in the previous embodiment, the plates 42 and 43 are provided with generally elongated arm portions 48 and 49 that extend from the cupped-out portion 46 to the respective ends of the plates.

The bearing block supporting plates 50 and 51, shown in Figs. 6 and 7, are similar to plates 25 and 26 of a previous embodiment in that their ends are joined together by eyelets 52, but differ therefrom in that they are not similarly formed. In this instance, one of the plates, plate 51, is bowed out between its ends while the other plate, 50, is not. Both, however, are bulged out about the central opening provided therein as at 53 and formed to fit about the rounded edge 54 of the bearing block 55, supported thereby.

Plates 60 and 61 of the embodiment shown in Figs. 8 and 9, are arranged in some respects similarly to the form shown in Figs. 4 and 5, principally differing therefrom in that the plates are not similarly formed and only one of them is cupped out about its central opening 62 to form a pocket 63 for an oil ring 64 and bearing block 65.

In all of the embodiments shown in the drawings and described above, the bearing block at one end of the shaft is free to rock or rotate to self-adjust itself into an aligned position with the bearing block at the other end of the shaft. The separate spacing blocks between the ends of the bearing block supporting plates and the motor field core may be roughly cut to length, as slight differences in length are compensated for by the self-aligning features of the bearing structure, and, therefore, the expense of manufacture is substantially reduced. Being made of porous metal and surrounded by a fibrous ring capable of being saturated with oil and to retain the same, the bearings are self-oiling.

Lengthwise movement of the shaft is permitted due to the resiliency of the arms of the bearing supporting plates which, due to their structure, may twist or give slightly when urged by an endwise pressure upon the shaft. This endwise cushioning of the shaft relieves the friction usually encountered due to the end thrust of armatures and decreases wear as well as increases motor efficiency. By such a structure, the bearing blocks may be assembled in closer lengthwise engagement with the shafts whereby end play is substantially eliminated and a more noiseless operation of the motor will result.

While I have shown and described a preferred embodiment of my invention, it will be understood that it is not to be limited to the details shown but is capable of modification and variation within the spirit of the invention and the scope of the appended claims.

What I claim is:

1. The combination of a frame having spaced apart members, a rotatable shaft disposed between said members, a pair of elongated plates each having end portions and an intermediate portion, each portion being connected to the other by resilient arm portions, said plates being clamped together and to one of said frame members at each of the end portions of said plates, a bearing sleeve adapted to receive said shaft interposed between said plates at the intermediate portions thereof and grippingly retained therebetween by the resiliency of said arm portions.

2. A bearing structure comprising a pair of elongated plates each having end portions and an intermediate portion, and arm portions connecting each of said end portions of each plate with the intermediate portion thereof, the portions of one plate opposing corresponding portions of the other, a bearing sleeve disposed between the opposing intermediate portions and retained therebetween by engagement thereby, and means to clampingly engage each of said opposed end portions to secure the same together and to a support, said arm portions being resilient to yieldingly permit axial movement of said bearing sleeve under urge of end thrust from a shaft journaled therein.

3. A bearing structure comprising a pair of elongated plates clampingly secured together at each end thereof, a bearing block interposed between an intermediate portion of said plates, and a ring of oil retaining fibrous material interposed between said plates and surrounding the outer periphery of said bearing block.

4. A bearing structure comprising a pair of elongated plates clampingly secured together at each end thereof, a bearing block interposed between an intermediate portion of said plates and retained therebetween by the pressing engagement thereof, said bearing block being made of porous bearing metal, and a ring of oil retaining fibrous material interposed between said plates and forced into close engagement with the periphery of said bearing block by said plates.

5. A bearing structure comprising a pair of elongated plates clampingly secured together at each end thereof, said plates being spaced apart intermediate their ends to form a pocket therebetween, a bearing block disposed in the pocket so formed between said plates and being clampingly engaged by said plates, and a fibrous oil retaining ring within said pocket and surrounding said bearing block.

6. A bearing structure comprising a pair of similarly formed elongated plates, each having end portions, an intermediate portion, and an arm portion connecting each end portion with said intermediate portion, the intermediate portion of each plate being spaced from that of the other plate, and the end portions of each plate being in engagement, a bearing block interposed between said spaced apart intermediate portions of said plates and retained therebetween by engagement thereby, a fibrous oil retaining ring surrounding said bearing block and being disposed between said plates, said arms of said plates being resilient and engaging said ring to press it against said bearing block.

7. A bearing structure comprising a pair of plates, each having an opening therein in alignment with the opening in the other, a bearing sleeve interposed between said plates and where engaged thereby having formed end edges, each of said plates being formed about the opening therein to substantially fit the form on the end edge of said bearing sleeve engaged thereby, one of said plates being secured to the other and one of said plates having oppositely directed resilient arms extending one from each side thereof, the outer end of each arm being adapted to be attached to a frame member.

8. A bearing structure comprising a pair of plates, each having an opening therein in alignment with the opening in the other, said plates being spaced apart at the portion adjacent the opening in each, a bearing block interposed between said plates and where engaged thereby having formed end edges, each of said plates being formed about the opening therein to substantially fit the form on the end edge of said bearing block engaged thereby, one of said plates being secured to the other, and one of said plates being elongated to form oppositely directed resilient arms adapted at the outer end of each to be attached to a frame member, said plates at the spaced apart portion forming a space about the periphery of said bearing block, and a fibrous oil retaining ring disposed in the aforesaid space between said plates and about said bearing block, said fibrous ring being retained in position in pressing engagement against said bearing block by said plates.

9. A bearing structure comprising a pair of resilient members, each having an arm portion extending radially therefrom at each side thereof, spaced supports to which the free ends of the arm portions are secured, a portion of one member being spaced away from a corresponding portion of the other and with the arm portion thereof in engagement with the arm portions of the other, and a tiltable bearing sleeve interposed between said members at the spaced apart portions thereof, the arm portions of each member being in alignment with each other and with the center of said bearing sleeve, said members by their resiliency permitting movement of the bearing sleeve longitudinally of its axis.

10. The combination of a frame having spaced apart members, a rotatable shaft disposed between said members, a bearing sleeve in which said shaft is journaled, and means to support said bearing sleeve comprising a pair of resilient plates, each having an arm portion extending therefrom at each side thereof, a portion of one plate being spaced away from a corresponding portion of the other and with the arm portions thereof in engagement with the arm portions of the other and secured at their ends one to each of said frame members, said bearing sleeve being disposed and movably held between opposing portions of said plates at the spaced apart portions thereof, and said plates being disposed in planes substantially transverse to the shaft axis.

ARTHUR A. ARNOLD.